US012288118B2

(12) United States Patent
Forster et al.

(10) Patent No.: US 12,288,118 B2
(45) Date of Patent: Apr. 29, 2025

(54) RFID ANTENNA FORMED BY MULTIPLE CUTTING PROCESSES

(71) Applicant: Avery Dennison Retail Information Services LLC, Mentor, OH (US)

(72) Inventors: Ian Forster, Chelmsford (GB); Edward McGinniss, Clinton, NC (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 679 days.

(21) Appl. No.: 17/437,876

(22) PCT Filed: Mar. 12, 2020

(86) PCT No.: PCT/US2020/022374
§ 371 (c)(1),
(2) Date: Sep. 10, 2021

(87) PCT Pub. No.: WO2020/186049
PCT Pub. Date: Sep. 17, 2020

(65) Prior Publication Data
US 2022/0172018 A1 Jun. 2, 2022

Related U.S. Application Data

(60) Provisional application No. 62/817,196, filed on Mar. 12, 2019.

(51) Int. Cl.
*G06K 19/077* (2006.01)
*B23K 26/38* (2014.01)
(Continued)

(52) U.S. Cl.
CPC ........ *G06K 19/07773* (2013.01); *B23K 26/38* (2013.01); *H01Q 1/2225* (2013.01); *H01Q 1/38* (2013.01)

(58) Field of Classification Search
CPC ........ H01Q 1/2225; H01Q 1/38; H01Q 9/065; H01Q 9/26; H01L 2224/48091; H01L 2224/73265
See application file for complete search history.

(56) References Cited

U.S. PATENT DOCUMENTS 10,186,765 B2 * 1/2019 Coleman ............... H01Q 1/2225
D958,120 S * 7/2022 Atojoko ....................... D14/230
(Continued)

FOREIGN PATENT DOCUMENTS

CN 106252815 12/2016
CN 107086892 8/2017
(Continued)

OTHER PUBLICATIONS

International Preliminary Report on Patentability dated Aug. 25, 2021 issued in corresponding IA No. PCT/US2020/022374 filed Mar. 12, 2020.
(Continued)

*Primary Examiner* — Minh N Trinh

(57) ABSTRACT

A method for manufacturing an antenna for an RFID device includes providing a conductive material on a substrate and performing a first cutting process on the conductive material to define an initial antenna. Additional cutting processes are performed on the initial antenna to define a final antenna, with the first and any subsequent cutting processes being different. The subsequent cutting processes are capable of more finely defining regions of the antenna, such as in some embodiments when the first cutting process is a die cutting process and a second cutting process is a laser cutting process. While the subsequent cutting processes are capable of more finely defining regions of the antenna than the first cutting process. By combining multiple cutting processes, a final antenna equivalent to one made using only one or more of the subsequent cutting processes may be created at a lower cost.

17 Claims, 2 Drawing Sheets

(51) Int. Cl.
*H01Q 1/22* (2006.01)
*H01Q 1/38* (2006.01)

(56) References Cited

U.S. PATENT DOCUMENTS

| | | |
|---|---|---|
| 2012/0080527 A1 | 4/2012 | Finn |
| 2012/0242318 A1 | 9/2012 | Forster |
| 2013/0135165 A1* | 5/2013 | Yamaguchi .............. H01Q 7/06 |
| | | 343/788 |
| 2016/0189023 A1 | 6/2016 | Forster |
| 2017/0344864 A1* | 11/2017 | Forster ............. G06K 19/07786 |
| 2019/0202006 A1* | 7/2019 | Forster ................. B23K 26/702 |
| 2022/0172018 A1* | 6/2022 | Forster ..................... H01Q 1/38 |

FOREIGN PATENT DOCUMENTS

| | | |
|---|---|---|
| CN | 107431265 | 12/2017 |
| CN | 108879068 | 11/2018 |

OTHER PUBLICATIONS

International Search Report and Written Opinion dated Jun. 3, 2020 issued in corresponding IA No. PCT/US2020/022374 filed Mar. 12, 2020.

* cited by examiner

RFID ANTENNA FORMED BY MULTIPLE CUTTING PROCESSES

CROSS REFERENCE TO RELATED APPLICATION(S)

The present application is a 371 of International Application No. PCT/US2020/022374 which was published in English on Sep. 17, 2020, and claims priority from U.S. Provisional Patent Application Ser. No. 62/817,196 filed on Mar. 12, 2019, both of which are incorporated herein by reference in their entirety.

FIELD OF THE DISCLOSURE

The present subject matter relates to radio frequency identification ("RFID") devices. More particularly, the present subject matter relates to antennas for RFID devices and methods for making such antennas.

DESCRIPTION OF RELATED ART

Devices incorporating RFID technology are widely used for a variety of different applications, including security locks in cars, access control to buildings, and inventory tracking systems in manufacturing, warehouse, in-store retail, and other operations enhanced by tracking functions.

RFID devices may have a variety of integrated components, among them an RFID chip containing data (e.g., an identification code) and an antenna electrically connected to the chip and responsible for transmitting signals to and/or receiving signals from another RFID device (e.g., an RFID reader system).

The antenna of an RFID device may be manufactured in a variety of ways, such as by patterning, etching, or printing a conductor on a substrate. The configuration of the antenna is important in properly tuning the antenna for communication with an RFID reader system and for optimal performance of the antenna. Some conventional approaches to forming an antenna on a substrate are low-cost, but are limiting on the structure of the resulting antenna. For example, the central transformer section of an antenna formed by a conventional die cutting procedure may have lines and gaps that are wider than desirable and/or loops with radii that are larger than desirable. Such constraints on the dimensions and/or shape of antennae formed by die cutting processes are due to the inherent limitations of die cutting processes. Another disadvantage of die cutting processes is that a new die is required for each antenna design. The need to design, manufacture, and use a new die for each antenna design results in increased time and expense. Other approaches are capable of more precisely forming an antenna, but they tend to be more expensive than the less precise approaches.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a method is provided for manufacturing an antenna for an RFID device. The method includes providing a conductive material on a substrate and performing a first cutting process on the conductive material to define an initial antenna. One or more subsequent cutting processes are performed on the initial antenna to define a final antenna, with the first and at least one of the one or more subsequent cutting processes being different. In some embodiments, the one or more subsequent cutting processes comprises a second cutting process. In some embodiments, the one or more subsequent cutting processes comprises a second cutting process and a third cutting process. In some embodiments, four or more cutting processes may be performed.

In another aspect, a method is provided for manufacturing an antenna for an RFID device. The method includes providing a conductive material on a substrate and performing a first cutting process via die cutting on the conductive material to define an initial antenna. One or more subsequent cutting processes are performed by laser cutting on the initial antenna to define a final antenna, with the laser cutting blowing at least a portion of the initial antenna off of the substrate. In some embodiments, the one or more subsequent cutting processes comprises a second cutting process performed by laser cutting. In some embodiments, the one or more subsequent cutting processes comprises a second cutting process and a third cutting process, where one or both of the second and third cutting processes comprise laser cutting.

According to a further aspect, a method is provided for manufacturing an antenna for an RFID device. The method includes providing a conductive material of aluminum foil on a substrate of paper material and performing a first cutting process on the conductive material to define an initial antenna. One or more subsequent cutting processes are performed on the initial antenna to define a final antenna, with the first and at least one of the one or more subsequent cutting processes being different. In some embodiments, the first cutting process is a die cutting process and at least one of the one or more subsequent cutting processes is a laser cutting process. In some embodiments, the one or more subsequent cutting processes comprise at least a second and a third cutting process, and one of the second or third cutting processes is different than the first cutting process and the other of the second or third cutting processes is the same as the first cutting process. For example, the first and second cutting processes may both be die cutting processes, while the third cutting process may be a laser cutting process. In other embodiments, the first and third cutting processes are both die cutting processes and the second cutting process is a laser cutting process.

In yet another aspect, a method is provided for manufacturing an antenna for an RFID device. The method includes providing a conductive material on a substrate and performing a first cutting process on at least one discrete region of the conductive material to define an initial antenna. One or more subsequent cutting processes are performed by removing substantially all of the conductive material at the at least one discrete region of the initial antenna to define a final antenna.

According to an added aspect, a method is provided for manufacturing an antenna for an RFID device. The method includes providing a conductive material on a substrate and performing a first cutting process on at least one discrete region of the conductive material to define an initial antenna. One or more subsequent cutting processes are performed by removing substantially all of the conductive material at the at least one discrete region of the initial antenna to define a final antenna, which at least one of the one or more subsequent cutting processes applies a laser in a plurality of offset passes within the at least one discrete region, with at least partially overlapping laser cuts removing substantially all of the conductive material in the at least one discrete region.

In accordance with a further aspect, a method is provided for manufacturing an antenna for an RFID device. The method includes providing a conductive material on a substrate and performing a first cutting process on the conductive material to define an initial antenna. One or more subsequent cutting processes are performed on the initial antenna to define a final antenna, with the first and at least one of the one or more subsequent cutting processes being different. At least one of the one or more subsequent cutting processes is performed on at least one discrete region of the initial antenna, and a first portion of the conductive material in the at least one discrete region is removed while retaining and isolating a second portion of the conductive material in the at least one discrete region.

Following an added aspect, a method is provided for manufacturing an antenna for an RFID device. The method includes providing a conductive material on a substrate and performing a first cutting process on the conductive material to define an initial antenna. One or more subsequent cutting processes are performed on the initial antenna to define a final antenna, with the first and at least one of the one or more subsequent cutting processes being different. A portion of the conductive material in a discrete region of the initial antenna is removed from the substrate during or following the one or more subsequent cutting processes.

According to another aspect, a method is provided for manufacturing an antenna for an RFID device. The method includes providing a conductive material on a substrate and performing a first cutting process on the conductive material to define an initial antenna. One or more subsequent cutting processes are performed on the initial antenna to define a final antenna, with the first and at least one of the one or more subsequent cutting processes being different. The initial antenna has portions selected from at least one line having a width of at least one millimeter and/or at least one loop having a radius of at least 0.75 millimeter, and at least one of the one or more subsequent cutting processes is performed to reduce the width of the at least one line and/or to reduce the radius of the at least one loop.

In a further aspect, a method is provided for manufacturing an antenna for an RFID device. The method includes providing a conductive material on a substrate and performing a first cutting process on the conductive material to define an initial antenna. One or more subsequent cutting processes are performed on the initial antenna to define a final antenna, with the first and second cutting processes being different. At least one of the one or more subsequent cutting processes is performed on at least a portion of at least one line and/or loop of a central transformer section of the final antenna.

In a further embodiment, at least one of the one or more subsequent cutting processes position relative to the first cutting process compensates for inaccuracies in the dimensions provided by the first cutting process.

In a further embodiment, at least one of the one or more subsequent cutting processes is performed after the RFID tag has a chip or strap attached to it, and the at least one of the one or more subsequent cutting process alters the dimensions of the structure formed using the first cutting process based on a measurement performed on the RFID tag, such as operational frequency, to allow compensation for manufacturing variations.

DESCRIPTION OF THE ILLUSTRATED EMBODIMENTS

The embodiments disclosed herein are for the purpose of providing a description of the present subject matter, and it is understood that the subject matter may be embodied in various other forms and combinations not shown in detail. Therefore, specific designs and features disclosed herein are not to be interpreted as limiting the subject matter as defined in the accompanying claims.

Figure 1A:
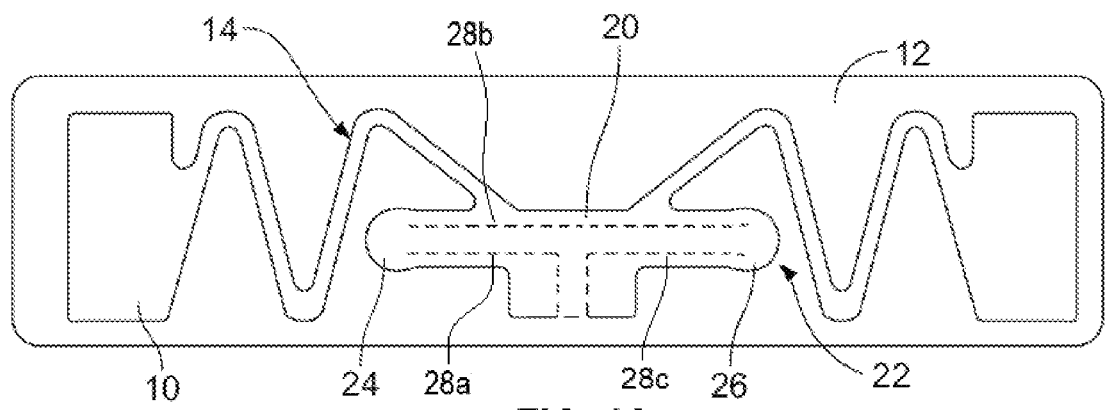
FIG. 1A is a top plan view of a first conductive pattern formed on a substrate using a first cutting process.
Figure 1B:
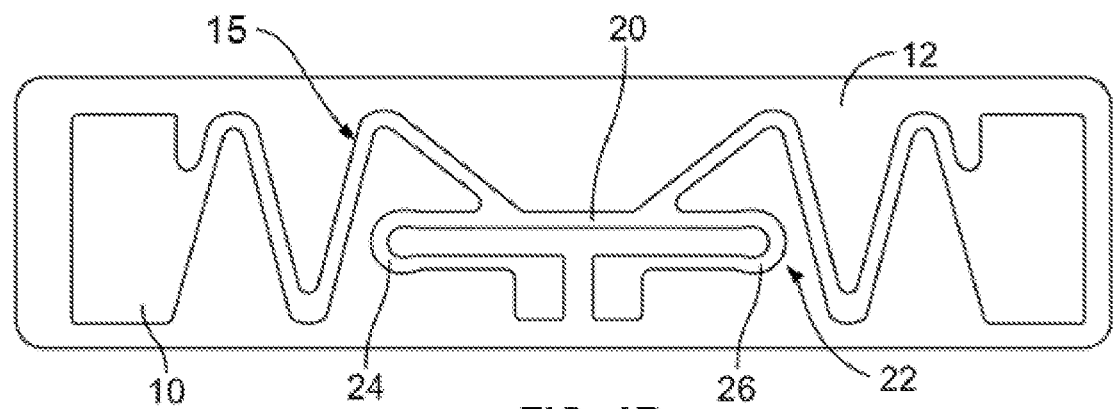
FIG. 1B is a top plan view of the first conductive pattern of FIG. 1A, configured as an initial antenna after a second cutting process.

FIGS. 1A and 1B show the basic structure of a partially manufactured RFID device. In the embodiment of FIG. 1A, a conductive material 10 is provided on a substrate 12. The conductive material 10 may be provided so as to cover all or a portion of one of the surfaces of the substrate 12. The nature of the conductive material 10, the substrate 12, and the manner in which the conductive material 10 is associated to the substrate 12 may vary without departing from the scope of the present disclosure. In one exemplary embodiment, the conductive material 10 comprises a thin metallic layer (e.g., an aluminum foil) that is secured to a substrate 12, which may be formed of any suitable paper material, by an adhesive. In other embodiments, the material composition of the conductive material 10 may differ (e.g., by being provided as some other conductor), the material composition of the substrate 12 may differ (e.g., by being provided as a fabric or glass or plastic or ceramic material), and/or the manner in which the two are joined may differ (e.g., with the conductive material 10 being crimped to the substrate 12).

In some embodiments, the conductive material 10 is subjected to a first cutting process to convert it from an initial or unprocessed shape or state to the roughly defined shape of an antenna, which structure is referred to herein as an initial or partially processed antenna 15. In some embodiments, a first cutting process and a second cutting process are used to convert conductive material 10 from an initial or unprocessed shape or state to the initial antenna 15. The shape of the initial antenna 15 approximates the shape of the conductive material 10 in its final state as a final or fully processed antenna 16 (an example being illustrated by FIG. 3), but differs from the shape of the final antenna 16 in at least one location. The difference between the respective shapes of the initial antenna 15 and of the final antenna 16 is due to the limitations of the first cutting process (and, optionally, the second cutting process) as compared to the capabilities of a subsequent, different cutting process (to be described).

According to some embodiments, die cutting is used as the first cutting process. In such embodiments, one limitation is related to removal of conductive material 10 from a central portion of a central transformer section 22 to form a gap therein. Due to the relatively small dimensions of the gap formed in the central transformer section 22, a portion of the conductive material 10 may become stuck within a portion of the die during the die cutting process. Over time, conductive material 10 may build up within this portion of the die, which may prevent the die from effectively cutting the conductive material 10 in this region. As a result, production processes must be temporarily stopped in order to remove any buildup of conductive material 10 from this portion of the die. This has the obvious disadvantage of increasing the time and costs associated with manufacturing RFID antennae.

Thus, according to some embodiments, a first cutting process comprises a die cutting process that cuts an outer perimeter of the conductive material 10 in the shape of the first conductive pattern 14 as indicated by the solid line in FIG. 1A, while the die may make one or more additional cuts within the central portion of central transformer section 22. For example, the die may make cuts along the lines indicated generally by dashed lines 28a, 28b, and 28c shown in FIG. 1A. The specific number or pattern of cuts made within central portion of central transformer section 22 may be varied without departing from the scope of the invention, so long as the cut or cuts do not completely cut along the portion of central transformer section 22 to form a gap therein. In this manner, conductive material 10 in a central portion of the central transformer section 22 remains on the substrate 12 after the first cutting process, notably because the die cutting process leaves one or more ties that aid in retaining the conductive material 10 on substrate 12 in this area. Thus, according to such an embodiment, the first cutting process does not form the gap in the central transformer section 22.

According to some embodiments, a subsequent cutting process is performed to complete formation of a gap within the central transformer section 22. In some embodiments, a second die cutting process is performed to cut one or more ties in the conductive material 10 that were formed during the first die cutting process. Because the die used in this second cutting process cuts along only part of a perimeter of the gap being formed in the central transformer section 22, (i.e., only along those parts that were not cut during the first cutting process), conductive material 10 will not become stuck within any portion of the second die. After completion of this second cutting process, conductive material 10 within central transformer section can be removed from substrate 12, as discussed further herein, resulting in the initial antenna 15 as shown in FIG. 1B.

In other embodiments, the interior portion of the central transformer section 22 is formed during a first cutting process. For example, a first die cutting process may cut and remove conductive material 10 from within a central portion of central transformer section 22. In such embodiments, the first cutting process produces an antenna having a shape substantially similar to initial antenna 15 as shown in FIG. 1B. That is, a first cutting process, such as a first die cutting process, will not leave ties within central transformers section 22 to form a first conductive pattern 14 as discussed above with respect to FIG. 1A, but rather will form the initial antenna 15 shown in FIG. 1B.

Regardless of whether a first cutting process forms the first conductive pattern 14 shown in FIG. 1A (with a second cutting process forming initial antenna 15 shown in FIG. 1B), or if the first cutting process instead forms initial antenna 15 directly, one or more additional cutting processes may be used to further refine the shape of the initial antenna 15. For example, the various lines and gaps of the initial antenna 15 may be constrained by the die cutting process. For example, the die cutting process can be of a type permitting a minimum width of approximately one millimeter and/or can be of a type permitting loops of the initial antenna 15 to have a minimum radius of approximately 0.75 millimeter. As will be understood by a person of skill in the art, thinner lines and/or loops with smaller radii may be preferred or required for improved tuning and performance. It should be understood that this is merely an example of an initial antenna 15 having a form that is incomplete in some way that prevents optimal tuning and/or performance of the RFID device, and that the form of the initial antenna 15 may be incomplete in some other way without departing from the scope of the present disclosure.

Figure 2:
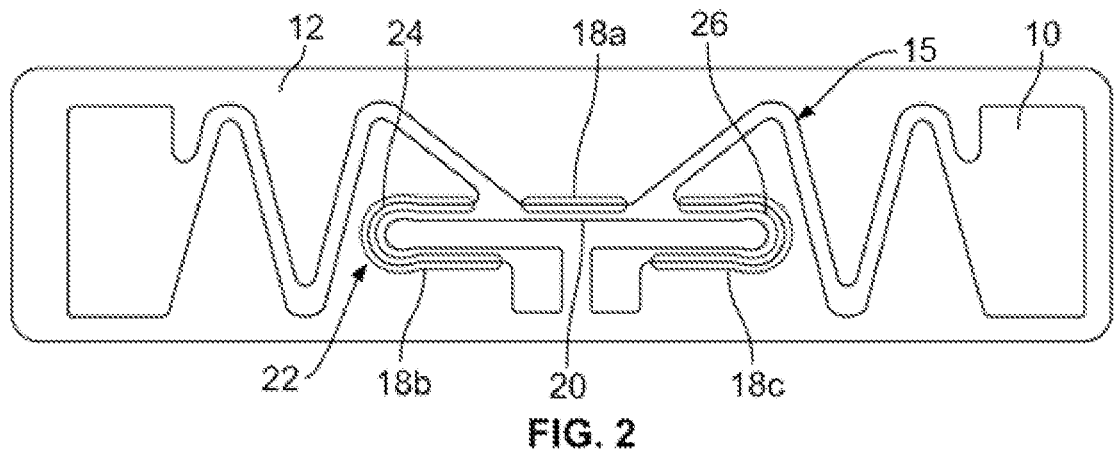
FIG. 2 is a top plan view of the initial antenna of FIG. 1B during a subsequent cutting process.
Figure 3:
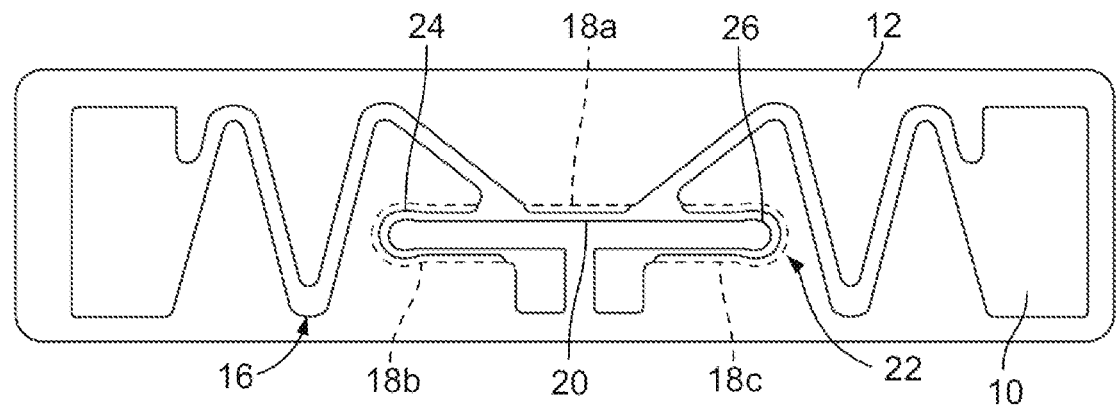
FIG. 3 is a top plan view of the initial antenna of FIG. 1B, configured as a final or fully processed antenna following the subsequent cutting process.

The nature of the first cutting process (and optionally a second cutting process) may vary without departing from the scope of the present disclosure, but it is preferably not selected for its ability to create finely defined regions of an antenna, but rather is selected due to relative advantages it has over one or more subsequent cutting processes having differing geometric and/or material handling properties. FIG. 2 shows examples of discrete regions 18a, 18b, and 18c of the initial antenna 15 being subjected to the one or more subsequent cutting processes to create the final antenna 16 of FIG. 3. The broken lines of FIG. 3 show the same discrete regions 18a, 18b, and 18c of the initial antenna 15, having been removed or electrically isolated in creating the final antenna 16.

In the illustrated embodiment, at least one of the one or more subsequent cutting processes is performed on one line 20 of a central transformer section 22 of the antenna (region 18a) and two loops 24 and 26 of the central transformer section 22 (regions 18b and 18c, respectively). If the first cutting process is a die cutting process, at least one of the one or more subsequent cutting processes may reduce the thickness of the line 20 to, for example, less than one millimeter in the region 18a, while reducing the radii of the loops 24 and 26 to, for example, less than 0.75 millimeter. Following implementation of the one or more subsequent cutting processes, the final antenna 16 will be properly shaped for optimal tuning and performance of the resulting RFID device.

It should be understood that the regions of application of the one or more subsequent cutting processes illustrated in FIG. 2 are merely exemplary. In other embodiments, the one or more subsequent cutting processes may be performed on only one line 20 of the central transformer section 22, on only one loop 24, 26 of the central transformer section 22, on only the two loops 24 and 26 of the central transformer section 22, or on one line 20 and one loop 24, 26 of the central transformer section 22, for example. In further embodiments, at least one of the one or more subsequent cutting processes may be applied to discrete regions outside of the central transformer section 22 (along with or instead of regions of the central transformer section 22 so as to also be subjected to the second cutting process). The exact regions in which the second cutting process are applied will depend upon the differences between the desired final configuration of the antenna (i.e., the final antenna 16) and the shape that is achieved using the first (and, in some embodiments, a second) cutting process (i.e., the initial antenna 15).

In contrast to the first (and, in some embodiments, a second) cutting process, at least one of the one or more subsequent cutting processes is selected for its ability to create finely defined regions of an antenna. Thus, in only those one or more selected regions in which it would be advantageous for the final antenna 16 to be more precisely defined than is capable using the first (and, optionally, second) cutting process (e.g., if a region is to be narrower or have a smaller radius than can be achieved by the first cutting process), one or more subsequent cutting processes are performed. While at least one of the one or more subsequent cutting processes could be employed in creating the entire final antenna 16 without first forming the initial antenna 15 using the first (and, optionally, second) cutting process, the advantages of the first (and, optionally, second) cutting process make it preferable to use the two different processes rather than forming the entire final antenna 16 using the subsequent cutting process. For example, the cost of the first cutting process may be less than the cost of at least one of the one or more subsequent cutting processes, in which case a final antenna 16 created using the two different processes (instead of the at least one of the one or more subsequent cutting processes alone) could be less expensive. In another example, the first cutting process may be faster than the second cutting process, in which case a final antenna 16 created using the two different processes (instead of the at least one of the one or more subsequent cutting processes alone) could be more quickly completed.

As noted above, the nature of the one or more subsequent cutting processes may vary without departing from the scope of the present disclosure. By way of example, the one or more subsequent cutting processes may be the same or may be different cutting processes. For example, each of the one or more subsequent cutting processes may be a laser cutting process, which is capable of creating more finely defined regions of an antenna than a die cutting process (for example). In other embodiments, at least one of the one or more subsequent cutting processes is a laser cutting process, and a different at least one of the one or more subsequent cutting processes is a die cutting process.

In one embodiment, in which the substrate 12 is formed of a paper material and the conductive material 10 is an aluminum foil, a fiber laser having a wavelength of approximately one micrometer may be employed to cut the aluminum foil without also cutting the substrate 12. Other subsequent cutting processes may be employed, with the selection of a subsequent cutting process being at least partially informed by the nature of the first cutting process (e.g., it is typically not preferred for the first cutting process to be more expensive than any one or more of the subsequent cutting processes). There are, however, several advantages to a laser cutting process being employed as the second cutting process. For example, depending on the dimensions of the removed material, the impact of the laser spot (which is approximately 30 to 100 micrometers, in one embodiment), along with hot gaseous aluminum and vaporized adhesive created by application of the laser, can be sufficient to blow at least a portion of the initial antenna 15 off of the substrate 12.

If substantially all of the conductive material 10 in a discrete region is to be removed, it may be removed during or following execution of at least one of the one or more subsequent cutting processes. One example of the material being removed during a subsequent cutting process is when the subsequent cutting process is a laser cutting process. In that case, the laser may be applied in multiple offset passes (e.g., in a spiral pattern) within a discrete region, with at least partially overlapping laser cuts removing substantially all of the conductive material 10 in the region by ablation.

Alternatively, as noted to above, rather than removing substantially all of the conductive material 10 in a discrete region, at least a portion of the conductive material 10 may be retained on the substrate 12, but electrically isolated from the final antenna 16. This may be achieved, for example, by removing a line of conductive material 10 so as to define a gap between the final antenna 16 and the portion of the conductive material 10 retained in the region, which effectively isolates the conductive material 10 in the region from the final antenna 16.

If the conductive material 10 is not removed during the one or more subsequent cutting processes, it may be removed following the one or more subsequent cutting processes. Examples of the material being removed following the one or more subsequent cutting processes may include the material being cleared from the substrate 12 by an air knife and/or a vacuum system after the one or more subsequent cutting processes have been executed.

Once the final antenna 16 has been created, an RFID chip may be electrically coupled to it to allow communication with another RFID-enabled device, such as an RFID reader. In addition to an RFID chip, it should be understood that RFID devices according to the present disclosure may include additional components beyond those shown in FIGS. 1-3. For example, the substrate 12 may include additional layers, such as a liner associated with the surface of the substrate 12 opposite the surface associated with the conductive material 10.

It will be understood that the aspects, embodiments and examples described herein are illustrative examples of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A method for manufacturing an antenna for an RFID device, comprising:
    providing a conductive material on a substrate;
    performing a first cutting process on the conductive material to define an initial antenna; and
    performing one or more subsequent cutting processes on the initial antenna to define the antenna, wherein the performing of the first cutting process and the performing of the one or more subsequent cutting processes are different, wherein the performing of the one or more subsequent cutting processes further comprising a laser cutting process, said laser cutting process comprises defining a portion of the initial antenna base on the performing of the first cutting process for removing from the substrate, and subsequently blowing the defined portion of the initial antenna off from the substrate to form the antenna.

2. The method of claim 1, wherein the first cutting process comprises a die cutting process.

3. The method of claim 1, wherein
    the laser cutting process comprises a laser with wavelength of approximately one micrometer,
    the substrate comprises a paper material, and
    the conductive material comprises aluminum foil.

4. The method of claim 1, wherein the first cutting process comprises a die cutting process and at least one of the one or more subsequent cutting processes comprises the laser cutting process.

5. The method of claim 1, wherein the performing of the one or more subsequent cutting processes is on at least one discrete region of the initial antenna, and the performing of the one or more subsequent cutting processes further comprises removing substantially all of the conductive material in said at least one discrete region.

6. The method of claim 5, wherein the performing of the one or more subsequent cutting processes further comprises applying a laser in a plurality of offset passes within said at least one discrete region, with at least partially overlapping laser cuts removing substantially all of the conductive material in said at least one discrete region.

7. The method of claim 1, wherein the performing of the one or more subsequent cutting processes is on at least one discrete region of the initial antenna, and the performing of the one or more subsequent cutting processes further comprises removing a first portion of the conductive material while retaining a second portion of the conductive material in said at least one discrete region and electrically isolating said second portion of the conductive material in said at least one discrete region from the final antenna.

8. The method of claim 1, further comprising removing at least a portion of the conductive material from the substrate in a discrete region of the initial antenna during the one or more subsequent cutting processes.

9. The method of claim 1, further comprising removing at least a portion of the conductive material from the substrate in a discrete region of the initial antenna following the one or more subsequent cutting processes.

10. The method of claim 9, wherein the removing comprises removing said at least a portion of the conductive material in said discrete region using an air knife.

11. The method of claim 9, wherein the removing comprises removing said at least a portion of the conductive material in said discrete region using a vacuum.

12. The method of claim 1, wherein the performing the one or more of the subsequent cutting processes on at least one line to reduce the width of at least a portion of said at least one line to less than one millimeter, the initial antenna includes the at least one line having a width of at least one millimeter.

13. The method of claim 1, wherein the performing the one or more of the subsequent cutting processes on at least one loop to reduce the radius of at least a portion of said at least one loop to less than 0.75 millimeter, wherein the initial antenna includes the at least one loop having a radius of at least 0.75 millimeter.

14. The method of claim 1, further comprising performing the one or more subsequent cutting processes on at least a portion of at least one line of a central transformer section of the antenna.

15. The method of claim 1, further comprising performing the one or more subsequent cutting processes on at least a portion of at least one loop of a central transformer section of the antenna.

16. The method of claim 1, further comprising performing the one or more subsequent cutting processes on at least a portion of at least one line of a central transformer section of the antenna and at least a portion of at least one loop of the central transformer section.

17. The method of claim 1, further comprising performing the one or more subsequent cutting processes on at least a portion of at least one line of a central transformer section of the antenna and at least a portion of a plurality of loops of the central transformer section.

* * * * *